No. 703,658. Patented July 1, 1902.
C. W. JOHANSEN.
MATTRESS STUFFING MACHINE.
(Application filed Aug. 23, 1901.)
(No Model.) 3 Sheets—Sheet 1.
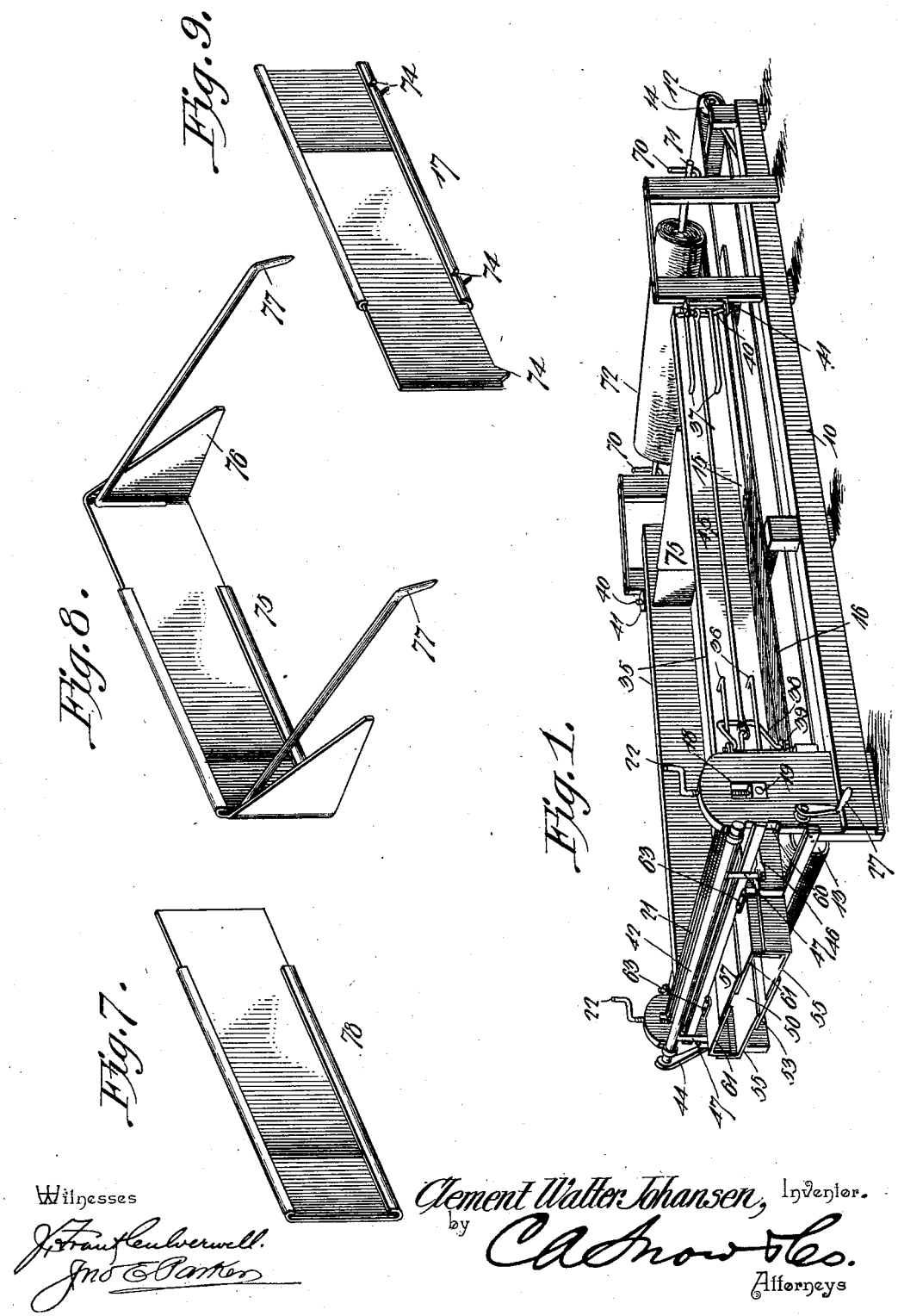
Witnesses
Clement Walter Johansen, Inventor.
by
C. A. Snow & Co.
Attorneys No. 703,658. Patented July 1, 1902.
C. W. JOHANSEN.
MATTRESS STUFFING MACHINE.
(Application filed Aug. 23, 1901.)
(No Model.) 3 Sheets—Sheet 2.
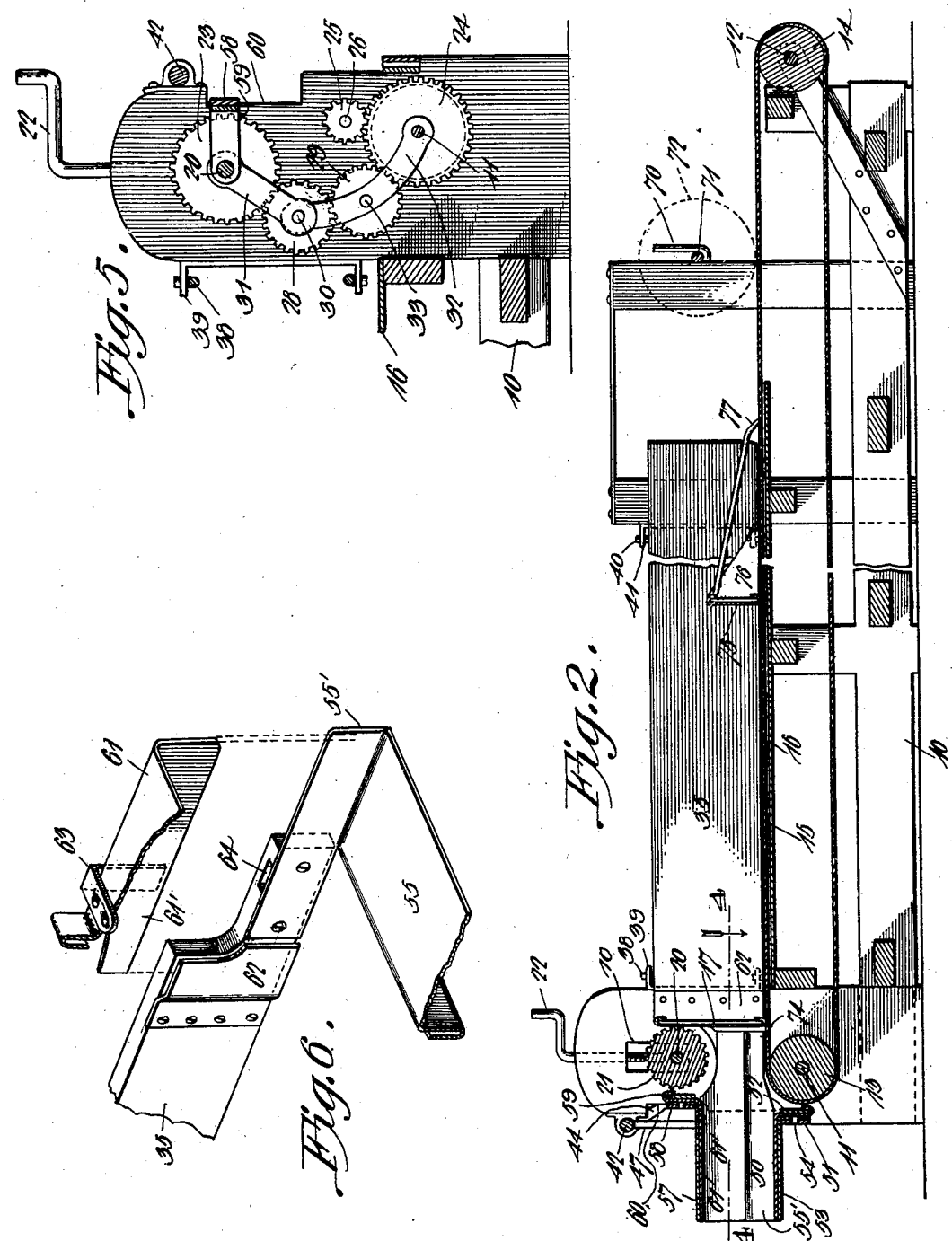
Witnesses
Clement Walter Johansen, Inventor.
by C. A. Snow & Co.
Attorneys

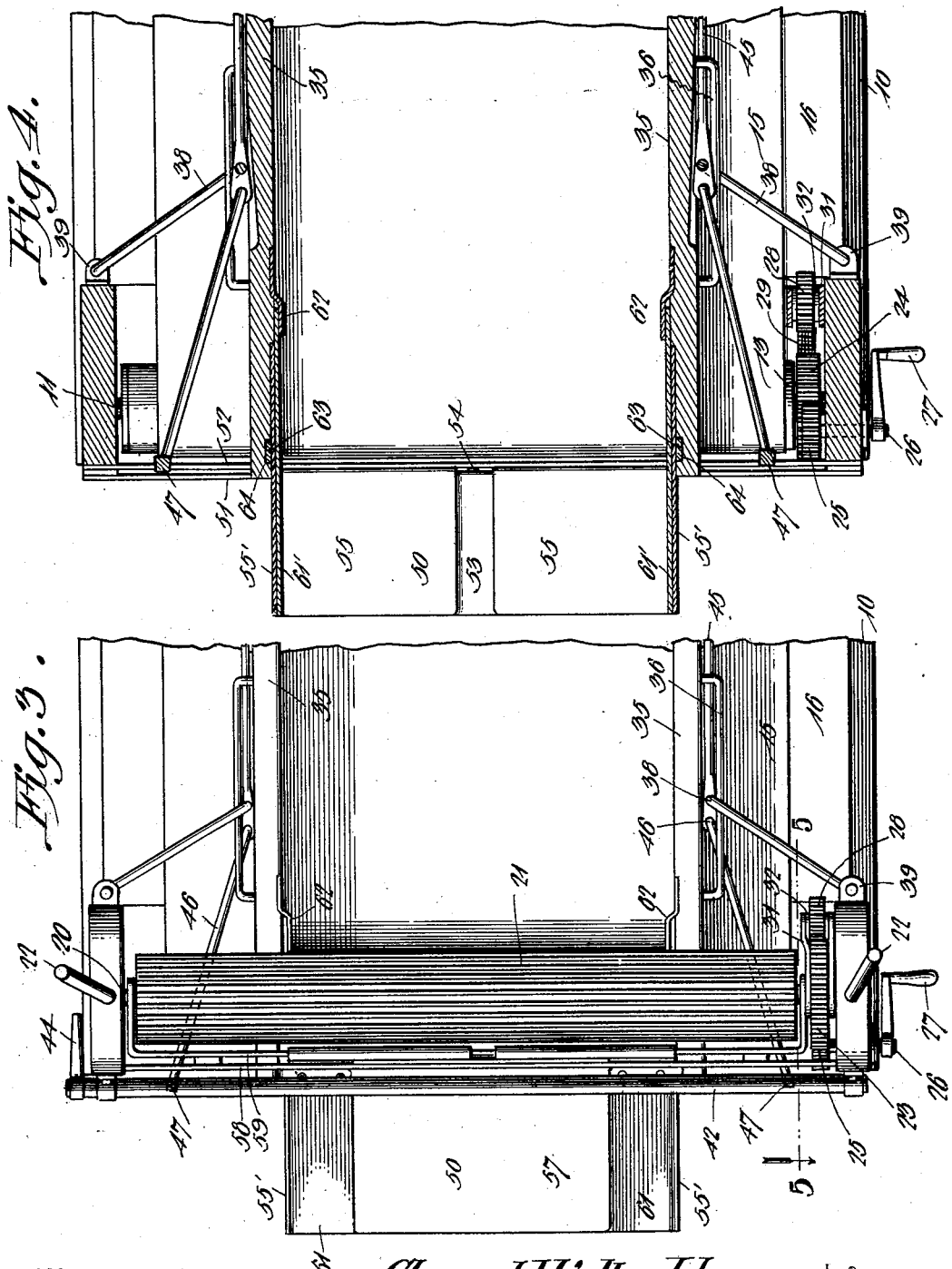

UNITED STATES PATENT OFFICE.

CLEMENT WALTER JOHANSEN, OF EVERETT, PENNSYLVANIA.

MATTRESS-STUFFING MACHINE.

SPECIFICATION forming part of Letters Patent No. 703,658, dated July 1, 1902.

Application filed August 23, 1901. Serial No. 73,063. (No model.)

*To all whom it may concern:*

Be it known that I, CLEMENT WALTER JOHANSEN, a citizen of the United States, residing at Everett, in the county of Bedford and State of Pennsylvania, have invented a new and useful Mattress - Stuffing Machine, of which the following is a specification.

My invention relates to certain improvements in mattress-stuffing machines, and has for its principal object to provide a machine by which mattresses of any required dimensions may be made.

A further object of the invention is to provide in such a machine for the direct action of feed and compressing rolls on the stuffing material in advance of its entrance to the delivering-chute.

A further object is to provide for the simultaneous adjustment of the side boards and chute sides and the similar vertical adjustment of the rolls and the height of the feed-chute.

Still further objects are to provide for the manufacture of a sectional mattress or of two mattresses at the same time, to provide means for effecting the discharge of all of the stuffing material to the tick, and to preserve the shape of the ends of the stuffing material during the process of filling the tick.

With these and other objects in view the invention consists in the novel construction and arrangement of parts hereinafter described, shown in the accompanying drawings, and particularly pointed out in the appended claims.

In the accompanying drawings, Figure 1 is a general perspective view illustrating a mattress-stuffing machine constructed and arranged in accordance with my invention. Fig. 2 is a longitudinal sectional elevation of the same. Fig. 3 is a plan view of the delivery end of the apparatus. Fig. 4 is a sectional plan view on the line 4 4, Fig. 2, drawn to a somewhat larger scale. Fig. 5 is a transverse sectional elevation of a portion of the device on the line 5 5 of Fig. 3. Fig. 6 is a detail perspective view of a portion of the delivery-chute. Figs. 7, 8, and 9 are detached perspective views of forming-plates employed to hold the stuffing material in position and more particularly described hereinafter.

10 designates a suitable framework on which the various operative parts of the machine are supported. At the extreme front and rear ends of the machine are shafts 11 and 12, respectively, for the support of rollers 13 and 14, over which passes a conveyer-belt 15, formed of canvas, leather, or other suitable material. The upper run of the belt is supported by a table 16, formed of any suitable material to support the weight of the stuffing material, and is of sufficient length to permit of the arrangement of stuffing material for the formation of a single mattress or of two or more mattresses, as may be desired, the length of the mattress to be formed being governed at one end by the plate 17 (shown in Fig. 9) and at the opposite end by the follower-plate. (Shown more clearly in Fig. 8.)

In the front standards forming part of the frame 10 are vertical guideways 18 for the reception of bearing-blocks 19, in which are journaled the opposite ends of a shaft 20, said shaft supporting a compression-roller 21 having a longitudinally-grooved peripheral surface, as shown more clearly in Figs. 2 and 3. The roller 21 is immediately above the lower compression-roller 13 and is adjustable vertically by means of cranked screws 22 to adjust the thickness of a mattress to be manufactured.

The rollers 21 and 13 are traveled in opposite directions and the feed-belt is traveled toward the delivery-chute by gearing comprising wheels 23 24, secured to the shafts 20 and 11, respectively, motion being imparted to the lower gear-wheel 24 by a pinion 25, secured to a shaft 26, having an operated handle 27 to be operated by manual power, or a belt-wheel may be secured upon this shaft and the machine driven by any suitable power device. The gear-wheels 23 and 24 are operatively connected by pinions 28 and 29, intermeshing with each other, as shown more clearly in Fig. 5. The shaft 30 of the pinion 28 forms a fulcrum-point of two arms 31 and 32, the former being hung on the shaft 20 and the latter being fulcrumed at its lower end on the shaft 11. The arm 32 also carries a pin 33, on which is journaled the pinion 29, the arrangement being such that the gears and pinions will at all times be in working contact and at the same time permit of the vertical adjustmentt of the shaft 20 to any desired extent.

In order to form guides for the stuffing material and to govern the width of a mattress being made, side boards 35 are provided, arranged at each side of the machine and extending from the rear of the compression-roller for any desired distance. The boards 35 rest upon the canvas belt, their lower rear ends being curved in order to permit the free movement of the belt, and on the outer side of each board, near its front and rear ends, are horizontally-disposed pairs of guides 36 and 37. Extending through the guides 36 are U-shaped levers 38, fulcrumed at their open ends in ears 39, carried by the frame, and the rear guides 37 are arranged for the reception of similar levers 40, pivoted in ears or lugs 41, carried by said frame, the construction and arrangement being such that the movement of the levers on their pivot-points will cause a movement of the side boards from or toward each other for the purpose of narrowing or widening a resultant mattress. For the purpose of simultaneously operating all of these levers there is provided a rock-shaft 42, mounted in suitable bearings at the upper front portion of the frame and extending transversely of said frame, one end of the shaft being provided with an operating-lever 44 for effecting the oscillation of the shaft to any desired extent.

The front lever 38 and the rear lever 40 of the same side board are connected by a rod 45, and the forward ends of such rods on both sides of the machine are connected by links 46 to two arms 47, carried by the rock-shaft 42. By operating the lever 44 the rock-shaft is turned in the desired direction and its movement is transmitted by the arms 47 and connecting-rods 46 and 45 to the front and rear operating-levers 38 and 40 of both side boards, the effect being to move said levers 38 and 40, with their pivot-ears as a center, and so adjust the distance between the side boards 35.

The chute 50, through which the compressed stuffing material is delivered to the ticking, is made in six pieces, which overlap each other to a considerable extent, permitting adjustment of the width and height of the chute to accommodate the size of the mattress being made. The lower portion of the chute is supported by a pair of spaced bars 51 52, extending transversely across the machine and rigidly secured at their opposite ends to the framework. The lower central plate of the chute is rigidly secured by a rivet 54 or suitable means to the bar 51 and never changes its position. The lower corner-sections 55 of the chute are L-shaped, their lower portions overlapping the central plate 53 and extending back to a point between the supporting-bars 51 and 52, at which point the plates are bent downwardly, passing between said bars and thence upwardly to the rear of the bar 52, the plates being supported by said bars, but free to move longitudinally of the same to effect their adjustment transversely of the machine. The vertical portion 55' of each of the lower corner-sections is extended to the rear and secured rigidly to the inner face of a side bar 35, so that as said side bar is moved the lower corner-piece will also be moved.

The upper central plate 57 of the chute is carried between parallel bars 58 and 59 and is secured to the bar 58 in the same manner as the lower central plate is secured to its carrying-bar. The bars 58 and 59 are secured to and move with each other, the opposite ends of the bar 59 being bent to the rear and provided with openings for the passage of the shaft 20, while the outer bar 58 travels on a vertical guiding-face 60, formed on the framework.

The upper corner-sections 61 of the chute are bent upwardly at their rear ends, passing between the bars 58 and 59, and thence are bent downwardly to the rear of said bar, the bars serving to support them in position, but permitting adjustment when necessary to alter the width of the chute. The vertical portions 61' of the upper corner-pieces are extended rearwardly and fit within guides 62, carried by the inner side of the side boards 35, the guides 62 overlapping the vertical portions of both the upper and lower corner members in order to prevent the catching of any of the stuffing material during its passage through the chute. To the upper corner members are secured angle-bars 63, having one arm rigidly secured to the top corner-piece, and the vertical arm being adapted to a recess 64, formed in the side board, and forming a connection between the upper corner-pieces and the side boards in order to simultaneously effect the adjustment of the corner-pieces of the chute with the side board without interfering with the vertical adjustment of the upper corner-pieces when the bar 59 and shaft 20 are moved.

Near the rear of the frame are brackets 70 for the reception of a spindle 71, on which may be placed a roll of cotton-batting 72 to form the outer layer of the mattress.

In operating the device the side boards and chute are first adjusted to govern the width and thickness of the mattress to be produced. The roll of cotton-batting is then unwound by the travel of the belt until a layer of cotton sufficient to form the top of the mattress is in proper position. I then place at the rear of the upper compressing-roller a plate 17, made in two sliding sections to adjust its length and provided with prongs 74 to assist in holding it in place. This plate prevents the premature entrance of any of the stuffing material between the rolls and is not removed until after all stuffing material is in place and ready for the operation of the compression-rolls. At a suitable point on the belt I then place an end plate 75, adjustable as to length and having side supporting-wings 76 and rearwardly-extending toothed bars 77, which engage in the belt and serve to hold the plate in proper position. This plate forms and preserves the shape of the stuffing material at the rear end of the mattress and is at such height as to enable it to pass through the rolls and delivery-chute, pushing the stuffing material before it until all of the stuffing material is delivered into the tick, the prongs 77 being of sufficient length to retain their engagement with the canvas belt until the last of the material has been ejected from the chute, after which the prongs may be readily disengaged from the belt and readjusted in a new position for the formation of another mattress, the movement of the belt being preferably in one direction only.

When a sectional mattress is to be made or where two full-size mattresses are to be simultaneously formed, I employ the division-plate 78. (Shown in Fig. 7.) This plate is made in two sections in order that its length may be adjusted to the width of the mattress and is placed at a suitable point between the plates 17 and 75 until the stuffing material is all arranged in place, after which the plate may be withdrawn.

The ribbed compression-roller acts directly on the stuffing material and not only feeds, but compresses the same before the material comes into frictional contact with the chute, the construction being particularly advantageous over those devices in which the material is subjected to sliding friction, causing an uneven packing and uneven compression of the material and resulting in an inferior mattress. The machine is not limited to manufacture of any particular kind of mattress and may be employed in the manufacture of any kind of layer or other mattresses, as desired.

Various modifications may be made in the proportions, sizes, and minor details of construction within the scope of the claims without departing from the spirit or sacrificing any of the advantages of the invention.

Having thus described my invention, what I claim is—

1. The combination of the belt forming a feed-table, a compressing-roll provided under the belt at the delivery end thereof, a delivery-chute extending from the end of the belt, a feed and compression roll situated above the first roll and adapted to act upon the stuffing material in advance of its entrance to the chute, and mechanism operatively connecting the upper portion of the chute to the upper roll and for effecting the simultaneous adjustment of both, substantially as specified.

2. The combination with the feed-belt and its lower compressing-roll, of a chute having an upper adjustable portion, a second compressing-roll situated above the first roll, means for vertically adjusting said second roll, and mechanism connecting the upper portion of the chute to the shaft of said second roll, whereby both the roll and chute may be simultaneously adjusted.

3. The combination with the feed-belt and its lower compressing-roll, of a chute having an upper adjustable portion, a pair of bars extending transversely of the machine and carrying the upper portion of the chute, one of said bars being guided by the frame and the opposite bar having rearwardly-extending perforated portions, a second compressing-roll mounted above the first roll, a shaft carrying said roll and passing through the perforated rearwardly-extending portions of the chute-carrying bar, guided blocks forming journals for said shaft, and means for vertically adjusting said blocks.

4. In a mattress-stuffing machine, the combination of the feed-belt, a delivery-chute arranged at one end thereof, side boards for governing the width of the mattress to be made, guides carried at the front and rear ends of said boards, pivoted levers adapted to said guides, and means for simultaneously operating said levers, substantially as specified.

5. In a mattress-stuffing machine, the combination of the feed-belt, a delivery-chute arranged at one end thereof, side boards for governing the width of the mattress to be made, guides arranged on the exterior and at each end of said side boards, levers fulcrumed to the fixed frame of the machine and adapted to said guides, connecting-rods extending between said levers, a rock-shaft, an operating-lever thereon, and mechanism connecting said rock-lever to said connecting-rods.

6. In a mattress-stuffing machine, the combination of the feed-belt, a delivery-chute at one end thereof, side boards for governing the width of the mattress to be made, guides arranged on the exterior and at each end of said side boards, levers 38 and 40 fulcrumed to the fixed frame of the machine and connected to the front and rear guides respectively, connecting-rods 45 extending between said levers, a rock-shaft 42 extending transversely of the frame of the machine and adapted to suitable bearings thereon, an operating-lever on said rock-shaft, arms 47 secured to the rock-shaft near the opposite ends thereof, and rods 46 extending between said arms and the connecting-rod 45, substantially as specified.

7. In a mattress-stuffing machine, the combination of the feed-belt, adjustable side sections forming part of a delivery-chute, adjustable side boards carrying said side sections, an upper compression-roll, means for adjusting the same and for adjusting the side boards, and mechanism connecting the shaft of said roll to the upper portion of the delivery-chute.

8. In a mattress-stuffing machine, the combination of the feed-belt, and lower compression-roll, of a delivery-chute having or comprising a series of vertically and laterally adjustable sections, an upper compression-roll, a shaft carrying the same, means for connecting the shaft to the vertical adjustable sections of the chute, side boards connected to the laterally-adjustable sections of the chute, and means for adjusting said side boards.

9. In a mattress-stuffing machine, the combination of a feed-belt and lower compression-roll, of a delivery-chute having laterally-adjustable lower corner-sections, and upper corner-sections adjustable both laterally and vertically, an upper compression-roll, a shaft carrying the same, means for connecting said shaft to the upper corner-sections, means for vertically adjusting said shaft, adjustable side boards connected to both the upper and lower corner-sections of the chute, and means for adjusting said side boards.

10. In a mattress-stuffing machine, the combination with a feed-belt and lower compression-roll, of a delivery-chute, having a fixed section 50 and a series of adjustable sections 55, 57 and 61, lower transverse bars carrying the fixed section and supporting the sections 55, upper transverse bars carrying the sections 57 and supporting the sections 61, an upper compression-roll, a shaft carrying said roll, said shaft being connected to the upper supporting-bar, means for vertically adjusting said shaft, side boards for governing the width of the mattress to be formed, said side boards being rigidly connected to the chute-sections 55 and slidably connected to the sections 61, with means for adjusting said side boards, substantially as specified.

11. In a mattress-stuffing machine, having a feed-belt and compression and delivery devices, an end plate formed in two sections for longitudinal adjustment, each of said sections having a rearwardly-extending supporting-wing and rearwardly-extending toothed bars, 77, adapted to engage in the material of which the belt is formed, substantially as specified.

In testimony that I claim the foregoing as my own I have hereto affixed my signature in the presence of two witnesses.

CLEMENT WALTER JOHANSEN.

Witnesses:
OSCAR D. DOTY,
WM. T. JOHNSON.